3,388,327
SYSTEM FOR MEASUREMENT OF MICROWAVE DELAY LINE LENGTH
Lee Sutton, Norco, and Jimmy J. Hoote, Riverside, Calif., assignors to the United States of America as represented by the Secretary of the Navy
Filed Oct. 19, 1965, Ser. No. 498,163
2 Claims. (Cl. 324—58)

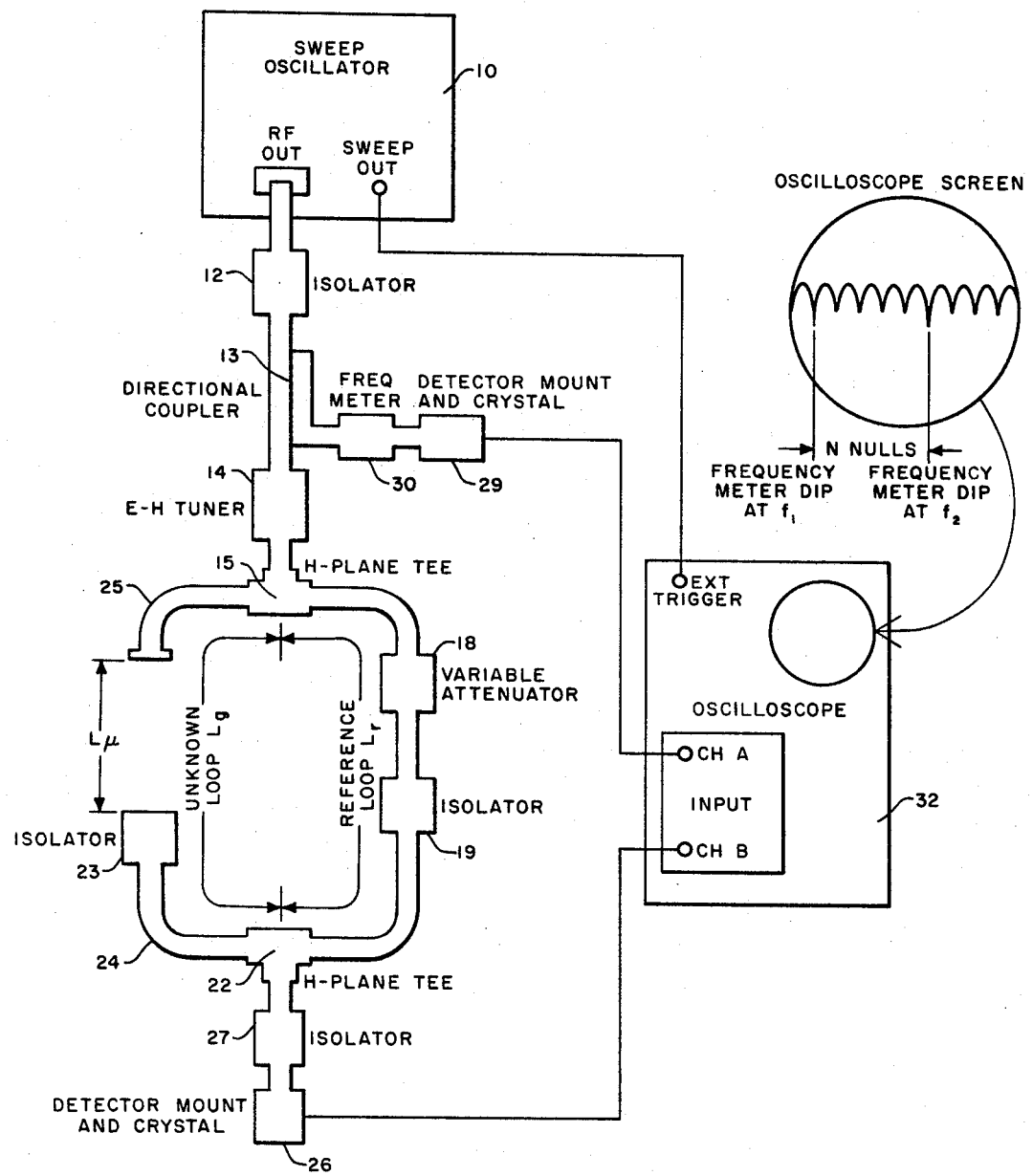

The invention herein described may be manufactured and used by or for the Government of the United States of America for governmental purposes without the payment of any royalties thereon or therefor.

This invention relates to waveguides and more particularly to the measurement of microwave delay line length.

Microwave delay lines often consist of diverse waveguide components such as isolators, bands, attenuators, twists, phase shifters, ferrite devices, and other miscellaneous components, assembled together, often within a box or cabinet, to form a complex microwave signal conditioning system. For the purposes of certification and calibration, etc., it is sometimes desirable to measure the length of delay lines when recourse to the tape measure is neither practical or possible. A precise and convenient system for making delay line length measurements utilizing equipment customarily found in a microwave laboratory is described herein. This system is especially useful in testing long lines or when only the input and output ports of the line are accessible, wherein other methods, involving time delay techniques are particularly cumbersome.

This invention is related to our copending U.S. patent application Ser. No. 498,164 filed Oct. 19, 1965, which is also for A System for Measurement of Microwave Delay Line Length.

The system of the present invention compares the phase of a swept signal through an unknown loop (i.e., a delay line of unknown length) with the phase of the swept signal through a known reference loop. The phase cancellation method of this system overcomes the drawbacks of the reflected signal method of the system disclosed in the aforementioned copending application.

It is an object of the invention to provide a new, precise and convenient system for electrically determining the length of a microwave delay line.

Another object of the invention is to provide a system for measuring delay line length where only the input and output ports of the line are accessible.

A further object of the invention is to provide a system for complex delay line length measurement.

Other objects and many of the attendant advantages of this invention will become readily appreciated as the same becomes better understood by reference to the following detailed description when considered in connection with the accompanying drawing wherein:

FIG. 1 is a diagrammatic illustration of the system of the present invention.

The equivalent free space length of a rectangular waveguide is related to its physical length by $$L_{fs} = L_g \frac{f_0}{\sqrt{(f_0^2 - f_c^2)}} \quad (1)$$

where
$L_{fs}$ = free space length
$L_g$ = physical length
$f_0$ = operating frequency
$f_c$ = cutoff frequency of the waveguide In the instant invention for measuring length of a waveguide by phase cancellation, as illustrated in FIG. 1, a sweep oscillator 10 is repetitively swept through a frequency range $f_1$ to $f_2$. The RF signal generated by oscillator 10 is fed through the usual waveguide isolator 12, a directional coupler 13 and E–H tuner 14 to the center port of an H–plane T 15. A reference loop ($L_r$) consisting of sections of waveguide, a variable attenuator 18 and a waveguide isolator 19, is connected between a side port of H–plane T 15 and the side port of H–plane T 22. The delay line or waveguide of unknown length to be measured is connected between the other side ports of H–plane T's 15 and 22 together with an isolator 23 and any connecting lengths 24 and 25 of waveguide needed for the purposes of measurement, to form the unknown loop ($L_g$) measured to the center of T's 15 and 22. Delta ($\delta$) represents the total fixed length of any waveguide sections 24 and 25, and the length ($L\mu$) of the delay line is $L_\mu = L_g - \delta$. Detector mount and crystal 26 is connected via waveguide isolator 27 to the center port of H–plane T 22. A detector mount and crystal 29 is connected to a frequency meter 30 which in turn is connected into the system via directional coupler 13. Detectors 26 and 29 are both connected to the input of oscilloscope display means 32. The sweep output of oscillator 10 is also fed to oscilloscope 32.

It should be noted here, that if desired, frequency meter 30 can be placed between detector 26 and isolator 27 at T junction 22, thus eliminating the need for directional coupler 13 and a second detector 29.

Isolator 12 prevents any reflected signals from perturbing sweep oscillator 10, and E–H tuner 14 is used to match the line to prevent unwanted standing waves. Variable attenuator 22 in the reference loop is used for control of signal level. Isolator 27 prevents reflected signals from detector 26 from getting into the system.

As the signal from oscillator 10 is swept through a frequency range $f_1$–$f_2$, a number of power peaks and nulls occur at T (mixer) 22 due to phase cancellation. The number of phase nulls that would be observed at T 22 due to the reference loop is $$N_r = L_r \frac{1}{\lambda_{1g}} - \frac{1}{\lambda_{2g}} \quad (2)$$

where
$L_r$ = physical length of the reference arm
$\lambda_{1g}$ = guide wavelength at frequency $f_1$
$\lambda_{2g}$ = guide wavelength at frequency $f_2$ The number of phase nulls actually observed at T 22 due to the unknown loop is $$N_g = L_g \left[ \frac{1}{\lambda_{1g}} - \frac{1}{\lambda_{2g}} \right] \quad (3)$$

where $L_g$ = length of the unknown loop.

The number of phase nulls (N) actually observed at T 22 as detected by crystal 26 is the difference of Equations 2 and 3 as they beat in T (mixer) 22:

$$N = L_g \left[ \frac{1}{\lambda_{1g}} - \frac{1}{\lambda_{2g}} \right] - L_r \left[ \frac{1}{\lambda_{1g}} - \frac{1}{\lambda_{2g}} \right]$$

which can be rewritten as $$L_g - L_r = N \left[ \frac{\lambda_{1g} \lambda_{2g}}{\lambda_{1g} - \lambda_{2g}} \right] \quad (4)$$

For rectangular waveguide, Equation 4 can be simplified by using the following relations $$f = \frac{C}{\lambda} \quad (5)$$

and $$\lambda_g = \frac{\lambda}{\sqrt{\left(1 - \left[\frac{\lambda}{\lambda_c}\right]^2\right)}} \quad (6)$$

where
λ = free space wavelength, cm
$f$ = transmitting frequency, in gc. (gigacycles)
$c$ = velocity of light $(2.9979 \times 10^{10}$ cm./sec.)
$\lambda_c$ = cutoff wavelength for the waveguide.

Accordingly:

$$L_g = NC\left[\frac{1}{\sqrt{(f_1^2 - f_c^2)} - \sqrt{(f_2^2 - f_c^2)}}\right] + L_r \quad (7)$$

where $f_1$ = highest selected frequency in gc.
$f_2$ = lowest selected frequency in gc.
$f_c$ = waveguide cutoff frequency
$N$ = the number of additional nulls generated as a result of changing the input frequency from $f_1$ to $f_2$.

The known fixed length ($\delta$) is then subtracted from $L_g$ to give the length of the delay line ($L_\mu$).

Equation 7 is useful only if the three parameters, $f_1$, $f_2$, and $N$ can be measured accurately, consistently and conveniently. The measurement set-up of FIG. 1 satisfies these criteria. Sweep oscillator is repeatedly swept through a frequency range such that a number of power peaks and nulls is presented on the screen of oscilloscope 32.

Frequency $f_1$ is established with the frequency meter 30 dip at the beginning of some convenient null. The frequency meter dip is then tuned through N nulls to frequency $f_2$. A standing wave pattern of only one null per wavelength is generated in T (mixer) 22 by phase cancellation. The allowable line insertion loss is 55–60 db.

In using the phase cancellation system of this invention it should be remembered that certain components may affect the signal differently than does plain waveguide. If a component affects propagation velocity or cutoff wavelength, then that component should be treated separately in converting from physical length to free-space length. Hence, it is important that no component (circular or flexible waveguide for example) be used in the reference loop.

Obviously many modifications and variations of the present invention are possible in the light of the above teachings. It is therefore to be understood that within the scope of the appended claims the invention may be practiced otherwise than as specifically described.

What is claimed is:

1. A system for measuring the length of a microwave delay line, comprising:
    (a) a sweep oscillator for repeatedly sweeping through a desired frequency range,
    (b) first and second waveguide H-plane T's,
    (c) a first waveguide means including a first waveguide isolator, a directional coupled and an E–H plane tuner connected in series to feed the frequency swept signal from said sweep oscillator to the center port of said first H-plane T,
    (d) a second waveguide means forming a reference loop of known length and including a variable attenuator and a second waveguide isolator connected in series betwen a side port of said first H-plane T and a side port of said second H-plane T,
    (e) a delay line of unknown length to be measured being connected between the other side port of said first H-plane T and the other side port of said second H-plane T and forming an unknown loop,
    (f) a third waveguide means including a first crystal detector and a waveguide isolator connected in series to the center port of said second H-plane T for observing the signal level in said second H-plane T,
    (g) a fourth waveguide means consisting of a second crystal detector and a frequency meter connected in series to said directional coupler for determining the frequency of the system at desired intervals,
    (h) a display means to which said crystal detectors are connected for viewing series of power changes in said second H-plane T due to phase interactions of the frequency swept signal through said known and unknown loops and measuring the number of nulls thereof,
    (i) the length of said delay line ($L_\mu$) being determined from the measured number of additional nulls (N), generated as a result of the frequency of said signal power level being changed from a first selected frequency ($f_1$) to a second selected frequency ($f_2$), and the measured value of the frequencies ($f_1$ and $f_2$ in accordance with the formula $$L_\mu = L_g - \delta = NC\left[\frac{1}{\sqrt{f_1^2 - f_c^2} - \sqrt{f_2^2 - f_c^2}}\right] - \delta$$

where C is the velocity of light $(2.9979 \times 10^{10}$ cm./sec.); $f_c$ is the cutoff frequency of the waveguide of the system and, $\delta$ is the known length of any waveguide added to the delay line forming the unknown loop for connection purposes to facilitate measurement.

2. A system for measuring the length of a microwave delay line, comprising:
    (a) an RF signal generator means operable to sweep through a desired range of frequencies,
    (b) first and second waveguide T junctions,
    (c) first waveguide means for feeding frequency swept signals from said signal generator means to the center port of said first T junction,
    (d) a second waveguide means of known length forming a reference loop connected between a side port of said first T and a side port of said second T,
    (e) a delay line of unknown length to be measured connected between the other side ports of said first and second T's and forming an unknown loop,
    (f) additional waveguide means including detector means for observing the signal power level in said second T junction and frequency measuring means for determining the frequency of the system at desired intervals,
    (g) display means for viewing the series of power changes observed by said detector means in said second T due to phase interactions of the frequency signal therein and the change in the number of nulls thereof between different selected frequencies,
    (h) the length of said delay line ($L_\mu$) being determined from the measured number of additional nulls (N), generated as a result of the frequency of said signal power level being changed from a first selected frequency ($f_1$) to a second selected frequency ($f_2$), and the measured value of the frequencies ($f_1$ and $f_2$) in accordance with the formula $$L_\mu = L_g - \delta = NC\left[\frac{1}{\sqrt{f_1^2 - f_c^2} - \sqrt{f_2^2 - f_c^2}}\right] - \delta$$

where C is the velocity of light $(2.9979 \times 10^{10}$ cm./sec.); $f_c$ is the cutoff frequency of the waveguide of the system and, $\delta$ is the known length of any waveguide added to the delay line forming the unknown loop for connection purposes to facilitate measurement.

References Cited
UNITED STATES PATENTS

| | | | |
|---|---|---|---|
| 2,971,153 | 2/1961 | Wharton et al. | 324—58 XR |
| 3,319,165 | 5/1967 | Hamlin et al. | 324—58 XR |

RUDOLPH V. ROLINEC, *Primary Examiner.*

P. F. WILLIE, *Assistant Examiner.*